United States Patent Office 3,690,900
Patented Sept. 12, 1972

3,690,900
SEASONING COMPOSITIONS CONTAINING 2-(LOWER-ALKOXY) INOSINE-5'-PHOSPHATES
Ryuji Marumoto, Minoo, Yoshio Yoshioka, Osaka, Hisashi Aoki, Suita, and Jun Toda, Nishinomiya, Japan, assignors to Takeda Chemical Industries, Ltd., Osaka, Japan
No Drawing. Original application June 26, 1968, Ser. No. 740,094. Divided and this application Apr. 22, 1971, Ser. No. 136,598
Claims priority, application Japan, June 26, 1967, 42/40,899
Int. Cl. A23l 1/26
U.S. Cl. 99—140 N          17 Claims

ABSTRACT OF THE DISCLOSURE

The 2-(lower-alkoxy)inosine-5'-phosphates (2-methoxy-, 2-ethoxy-, 2-n-propoxy- and 2-isopropoxy-inosine-5'-phosphates) have a high capacity for improving the flavor of foods and beverages. Moreover, there is a significant synergistic action therebetween and monosodium glutamate.

---

This application is a division of application S. N. 740,094 filed June 26, 1968, now patent number 3,644,331.

This invention relates to a novel seasoning composition, a method for preparing the same and a method for improving or enhancing flavor of foods or beverages.

5'-purine-nucleotides such as 5'-inosinic acid and 5'-guanylic acid have practically been employed as chemical condiments because of their strong flavor-enhancing effect (see French Pats. Nos. 1,219,220 and 1,255,334).

It has been found by the present inventors that 2-(lower alkoxy)inosine-5'-phosphates of the formula:

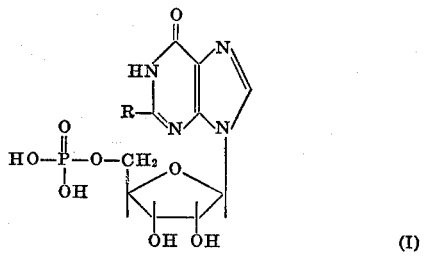

wherein R stands for a lower alkoxy group having at most 3 carbon atoms, all of them being novel compounds, have a much higher ability of improving or enhancing flavor of foods or beverages than that of 5'-insonic acid.

It has further been found that there is a significant synergistic action between the 2-(lower alkoxy)inosine-5'-phosphates (I) and monosodium glutamate.

It is an object of the present invention to provide a novel seasoning composition. Another object of the present invention is to provide a method for preparing the said seasoning composition. Further object of the present invention is to provide a method for improving or enhancing the flavor of food or beverages.

The 2-(lower alkoxy)inosine-5'-phosphates (I) include 2-methoxyinosine-5'-phosphate, 2-ethoxyinosine-5' - phosphate, 2-n-propoxyinosine-5'-phosphate and 2-isopropoxyinosine-5'-phosphate.

These 2-(lower alkoxy)inosine-5'-phosphates are prepared, for example, by phosphorylating a corresponding 2-(lower alkoxy)inosine or 2-(lower alkoxy)-2',3'-isopropylideneinosine and subsequently subjecting the resultant product to hydrolysis. As the phosphorylating agent, pyrophosphoryl tetrachloride, phosphoryl chloride or partially hydrolyzed phosphoryl chloride may most advantageously be employed. The phosphorylating reaction proceeds smoothly at a temperature between 0° and 10° C. If a reaction solvent is necessary, there can be employed phenols such as phenol, cresol, xylenol, etc.

The hydrolysis of the thus-obtained product is carried out by per se known procedure, for example by pouring the reaction mixture into water, preferably cooled water, or by weakening the acidity of the reaction mixture desirably to about pH 1 to 2 with the addition of an alkaline material such as sodium hydroxide, sodium carbonate and, if necessary, heating the mixture at a temperature between 60° and 80° for 15 to 60 minutes.

The 2-(lower alkoxy)inosine or 2-(lower alkoxy)-2',3'-isopropylideneinosine to be employed as the starting material can be prepared, for example, by subjecting an alkali metal salt or ammonium salt of 2-mercaptoinosine to the action of chlorine gas at 0° to 10° C. in an alcohol containing concentrated hydrochloric acid and subjecting the thus-obtained 2-chloroinosine or 2-chloro-2',3'-isopropylideneinosine prepared from the 2-chloroinosine to the action of sodium alkoxide.

For the purpose of this invention, the thus-obtained 2-(lower alkoxy)inosine-5'-phosphates can be employed in the free form or as a physiologically acceptable salt such as alkali metal salt, e.g. sodium salt, potassium salt; alkaline earth metal salt, e.g. calcium salt; ammonium salt; amine salt such as cyclohexylamine salt.

The respective threshold values of the 2-(lower alkoxy) inosine-5'-phosphates (I) determined by "the forced-choice method of limits" described in "American Journal of Psychology," vol. 69, pp. 672 to 673, are as follows:

| Compound: | Threshold value percent in water |
|---|---|
| Disodium 2-methoxyinosine-5'-phosphate | 0.0141 |
| Disodium 2-ethoxyinosine-5'-phosphate | 0.0077 |
| Disodium 2-n-propoxyinosine-5'-phosphate | 0.0119 |
| Disodium 2-isopropoxyinosine-5'-phosphate | 0.0084 |

As clearly shown in the above table, the respective threshold values of the 2-(lower alkoxy)inosine-5'-phosphates (I) are far lower than that of disodium-5'-inosinate per se, which means that these compounds can be detected at a lower concentration than 5'-inosinic acid. Further, as mentioned hereinbefore, when the 2-(lower alkoxy)inosine-5'-phosphates are employed in combination with monosodium glutamate, a remarkable synergistic action is observed between these compounds and the monosodium glutamate. That is, as clearly shown in tests described hereinafter in the co-presence of monosoidum glutamate, the flavor-enhancing effect of these compounds is as much as about 5 times as strong as that of 5'-inosinic acid per se.

It is also known that 2-methylthioinosine-5'-phosphate and 2-ethylthioinosine-5'-phosphate are possessed of a flavoring effect stronger than that of 5'-inosinic acid per se (see French Pat. No. 1,463,442). The 2-(lower alkoxy) inosine-5'-phosphates (I) of the present invention are more stable and more non-toxic than these known 5'-inosinic acid derivatives.

The 2-(lower alkoxy)inosine-5'-phosphates (I) can be added to foods or beverages, in the solid state or in a liquid state, i.e. dissolved in water or hydrophilic palatable and edible organic solvent, e.g. alcohol. In improving or enhancing the flavor of foods or beverages, the objective foods or beverages are mixed with a 2-(lower alkoxy) inosine-5'-phosphate (I), or are impregnated with a solution of a 2-(lower alkoxy)inosine-5'-phosphate, or sprinkled over with the solution. The addition of a 2-(lower alkoxy)inosine-5'-phosphate is carried out during or after the preparation of the foods or beverages.

Foods or beverages to be seasoned include, for example, fermented foods such as bean paste (miso), soy sauce, vinegar, *sake*; paste such as ham paste, sausage, steamed fish paste (kamaboko or chikuwa); meats such as whale meat, poultry meat, pork, beef; noodles such as macaroni; milk and its processed matters such as cow's milk, condensed milk, cheese; processed vegetables such as tomato juice, canned spinach; cooked foods such as soups, stews.

In most cases, it is preferable to employ the 2-(lower alkoxy)inosine-5'-phosphates together with monosodium glutamate and, if desired, another chemical condiment such as disodium 5'-guanylate or sodium succinate. The ratio of the 2-(lower alkoxy) inosine-5'-phosphates relative to the monosodium glutamate is advantageously about 1/500 to 1/3.

The preparation of the seasoning composition comprising the 2-(lower alkoxy)inosine-5'-phosphate (X) and monosodium glutamate can be carried out by simply mixing, or by preparing a nucleus of either the 2-(lower alkoxy)inosine-5'-phosphate (I) or the monosodium glutamate and successively adhering other components to the nucleus. If desired, a composition of the 2-(lower alkoxy) inosine-5'-phosphate (I) and monosodium glutamate, irrespective of whether it is powdery or granular, can be coated with a known coating agent. As the coating agent there may be used aliphatic acid esters of sugars, e.g. sucrose fatty acid esters, gelatin, casein, edible waxes, stearic acid, vegetable proteins, monoglycerides, etc.

The most effective amount of the 2-(lower alkoxy)-inosine-5'-phosphate to be employed varies with kinds of foods or beverages, but generally, about 0.0005 to 0.03% relative to foods or beverages is advantageous.

In the following tests and examples, percentages are by weight; parts by volume bear the same relationship to parts by weight as do milliliters to grams; "two-sample directional test," "constant method" and "probit analysis" employed in the following tests are those described on pp. 330–332 of "Principles of Sensory Evaluation of Food" published by Academic Press, New York and London, in 1965, pp. 118–141 of "Psychometric Methods," 2nd. edition published by McGraw-Hill Book Company, Inc., New York, and "Probit Analysis, a Statistical Treatment of the Sigmoid Responsive Curve" published by Cambridge Univ. Press in 1952, respectively.

Test 1

Sample A: Aqueous solution containing 0.8% of sodium chloride plus 0.03% of disodium 2-methoxyinosine-5'-phosphate.

Sample B: Aqueous solution containing 0.8% of sodium chloride plus 0.03% disodium 5'-inosinate.

Two-sample directional tests were carried out between Sample A and Sample B, and 19 out of 20 persons judged the flavor of Sample A stronger than that of Sample B (significant at 0.1% level).

Test 2

Sample A: Aqueous solution containing 1% of soy sauce, 0.6% of sodium chloride plus 0.001% of disodium 2-methoxyinosine-5'-phosphate.

Sample B: Aqueous solution of the same composition as Sample A except that 0.001% of disodium 2-methoxyinosine-5'-phosphate is replaced by the same amount of disodium 5'-inosinate.

Two-sample directional tests were carried out between Sample A and Sample B, and 16 out of 20 persons judged the flavor of Sample A stronger than that of Sample B (significant at 1% level).

Test 3

Sample A: Aqueous solution containing 0.8% of sodium chloride and 0.03% of disodium 2-ethoxyinosine-5'-phosphate.

Sample B: Aqueous solution containing 0.8% of sodium chloride and 0.03% of disodium 5'-inosinate.

Two-sample directional tests were carried out between Sample A and Sample B, and 19 out of 20 persons judged the flavor of Sample A stronger than that of Sample B (significant at 0.1% level).

Test 4

Sample A: Aqueous solution containing 1% of soy sauce, 0.6% of sodium chloride and 0.01% of disodium 2-ethoxyinosine-5'-phosphate.

Sample B: Aqueous solution of the same composition as Sample A except that 0.01% of disodium 2-ethoxyinosine-5'-phosphate is replaced by the same amount of disodium 5'-inosinate.

Two-sample directional tests were carried out between Sample A and Sample B, and 17 out of 20 persons judged the flavor of Sample A stronger than that of Sample B (significant at 1% level).

To compare quantitatively the flavor-enhancing effect of a specified 2-(lower alkoxy)inosine-5'-phosphate with that of disodium 5'-inosinate, further tests as shown in Tests 5 and 7 were carried out according to the "constant methods" (panel: 50 members) in which the Sample A is a standard sample and the Samples 1 to 5 are variable ones. The concentration of disodium 5'-inosinate equivalent to Sample A in flavor-enhancing effect was determined by the application of the probit analysis to the resulting data shown in Tables 1 to 3.

TEST 5

| | Percent | | |
|---|---|---|---|
| | Sodium chloride | Monosodium glutamate | Disodium 2-methoxyinosine-5'-phosphate |
| Sample: | | | |
| A | 0.8 | 0.100 | 0.00025 |
| | | | Disodium 5'-inosinate |
| 1 | 0.8 | 0.100 | 0.00055 |
| 2 | 0.8 | 0.100 | 0.00074 |
| 3 | 0.8 | 0.100 | 0.00100 |
| 4 | 0.8 | 0.100 | 0.00135 |
| 5 | 0.8 | 0.100 | 0.00182 |

TABLE 1

| Comparison between: | Number of persons [1] |
|---|---|
| Samples A and 1 | 38 (76%) |
| Samples A and 2 | 26 (52%) |
| Samples A and 3 | 24 (48%) |
| Samples A and 4 | 20 (40%) |
| Samples A and 5 | 8 (16%) |

[1] Who judged the flavor of Sample A stronger.

The probit analysis as to the results in Table 1 revealed that 0.00025% of disodium 2-methoxyinosine-5'-phosphate is equivalent to 0.00092% of disodium 5'-inosinate in a flavor-enhancing effect and, therefore, that the flavor-enhancing effect of disodium 2-methoxyinosine-5'-phosphate is 3.7 times as strong as that of disodium 5'-inosinate.

TEST 6

| | Percent | | |
|---|---|---|---|
| | Sodium chloride | Monosodium glutamate | Disodium 2-ethoxyinosine-5'-phosphate |
| Sample: | | | |
| A | 0.8 | 0.100 | 0.00025 |
| | | | Disodium 5'-inosinate |
| Sample: | | | |
| 1 | 0.8 | 0.100 | 0.00055 |
| 2 | 0.8 | 0.100 | 0.00074 |
| 3 | 0.8 | 0.100 | 0.00100 |
| 4 | 0.8 | 0.100 | 0.00135 |
| 5 | 0.8 | 0.100 | 0.00182 |

TABLE 2

| Comparison between: | Number of persons [1] |
|---|---|
| Samples A and 1 | 42 (84%) |
| Samples A and 2 | 38 (76%) |
| Samples A and 3 | 34 (68%) |
| Samples A and 4 | 22 (44%) |
| Samples A and 5 | 12 (24%) |

[1] Who judged the flavor of Sample A stronger.

The probit analysis as to the results in Table 2 revealed that 0.00025% of 2-ethoxyinsosine-5'-phosphate is equivalent to 0.00122% of disodium 5'-inosinate in flavor-enhancing effect and, therefore, that the flavor-enhancing effect of disodium 2-ethoxyinosine-5'-phosphate is 4.9 times as strong as that of disodium 5'-inosinate.

TEST 7

| | Percent | | |
|---|---|---|---|
| | Sodium chloride | Monosodium glutamata | Disodium 2-isopropoxyinosine-5'-phosphate |
| Sample: | | | |
| A | 0.8 | 0.100 | 0.00025 |
| | | | Disodium 5'-inosinate |
| 1 | 0.8 | 0.100 | 0.00055 |
| 2 | 0.8 | 0.100 | 0.00074 |
| 3 | 0.8 | 0.100 | 0.00100 |
| 4 | 0.8 | 0.100 | 0.00135 |
| 5 | 0.8 | 0.100 | 0.00182 |

TABLE 3

| Comparison between: | Number of persons [1] |
|---|---|
| Samples A and 1 | 40 (80%) |
| Samples A and 2 | 32 (64%) |
| Samples A and 3 | 34 (68%) |
| Samples A and 4 | 24 (48%) |
| Samples A and 5 | 8 (16%) |

[1] Who judged the flavor of Sample A stronger.

The probit analysis as to the results in Table 3 revealed that 0.00025% of disodium 2-isopropoxyinosine-5'-phosphate is equivalent to 0.00113% of disodium 5'-inosinate in flavor-enhancing effect and, therefore, that the flavor-enhancing effect of 2-isopropoxyinosine-5'-phosphate is 4.5 times as strong as that of disodium 5'-inosinate.

EXAMPLE 1

23 parts by weight of 2-methoxyinosine is dissolved in 1000 parts by volume of metacresol. Into the resultant solution is added dropwise with vigorous stirring 80 parts by volume of pyrophosphoryl chloride at 5 to 10° C. The mixture is kept standing with stirring at the same temperature for 3 hours. The reaction mixture is poured into 10,000 parts by volume of ice water and the whole mixture is shaken with 10,000 parts by volume of diethyl ether to transfer the metacresol into the resulting diethyl ether layer.

The aqueous layer is adjusted to pH 7 with 1 N-sodium hydroxide solution and then is concentrated under reduced pressure to remove diethyl ether still existing in it. The aqueous layer is adjusted to pH 1 with 1 N-hydrochloric acid and is allowed to pass through a column packed with 500 parts by weight of activated charcoal. The column is washed with water and is subjected to elution with 4000 parts by volume of a mixture of ethyl alcohol, n-butyl alcohol, 28% aqueous ammonia and water (45:5:2:48 by volume). The eluate is concentrated to 500 parts by volume. The concentrated solution is allowed to pass through a column packed with 1000 parts by volume of cation exchange resin (Na+ type of Amberlite IR-120). The effluent is concentrated under reduced pressure to give 25 parts by weight of residue. The residue is dissolved in 100 parts by volume of water. The solution is kept standing in a cool place for 12 hours to give crystals of disodium 2-methoxyinosine-5'-phosphate. The crystals are collected from the solution. To the solution is added 200 parts by volume of ethyl alcohol to give crystals of disodium 2-methoxyinosine-5'-phosphate. The total yield of thus-obtained 2-methoxyinosine-5'-phosphate is 15 parts by weight.

This product gives a single ultraviolet absorption figure in paper electrophoresis (0.05 M-borate buffer, pH 9.2), the absorption $$\lambda_{max.}^{H_2O} \ 244 \ m\mu \ (\epsilon 10450)$$

*Elementary analysis.*—Calculated for $$C_{11}H_{13}O_9N_4PNa_2 \cdot 2H_2O$$

(percent): C, 28.95; H, 3.71; N, 12.25. Found (percent): C, 28.67; H, 4.46; N, 12.15.

EXAMPLE 2

(A) 0.9075 part by weight of 2-chloroinosine is suspended in 50 parts by volume of acetone. To the suspension is added 3 parts by volume of phosphoryl chloride at 5 to 10° C. and the resultant mixture is kept standing with stirring at the same temperature for 1.5 hours.

The reaction mixture is poured into a mixture of 15 parts by volume of a 28% aqueous ammonia and 100 parts by volume of ice water and the whole mixture is concentrated under reduced pressure to remove acetone. The concentrated solution is adjusted to pH 4.5 with acetic acid and is allowed to pass through a column packed with 9 parts by weight of activated charcoal. After being washed with water, the column is subjected to elution with 200 parts by volume of a mixture of n-butyl alcohol, ethyl alcohol, a 28% aqueous ammonia and water (5:45:2:48 by volume ratio). The eluate is concentrated under reduced pressure to give 1.00 part by weight of 2-chloro-9-(2',3'-isopropylidene - β - D - ribofuranosyl)hypoxanthine as crystalline powder.

(B) 18 parts by weight of 2-chloro - 9 - (2',3' - isopropylidene-β-D-ribofuranosyl)hypoxanthine is dissolved in 1000 parts by volume of 2 N-sodium ethoxide and the solution is refluxed for 5 hours. The reaction mixture is poured into 1000 parts by volume of ice water. The mixture is adjusted to pH 7 with acetic acid and is then concentrated under reduced pressure to remove ethyl alcohol layer. The resulting aqueous layer is subjected to extraction with 1000 parts by volume of chloroform. The chloroform layer is dehydrated with anhydrous calcium chloride and is then concentrated under reduced pressure to give 20 parts by weight of 2-ethoxy-9-(2',3'-isopropylidene - β - D - ribofuranosyl) - xanthine as an oily substance (77.5% purity).

Ultraviolet absorption:

$$\lambda_{max.}^{0.1 \ N \ HCl} \ 252 \ m\mu$$

$$\lambda_{max.}^{0.1 \ N \ NaOH} \ 261 \ m\mu$$

When this product is subjected to thin layer chromatography on silica gel employing as the developer a mixture of methyl alcohol and chloroform (1:5), it gives a single ultraviolet absorption figure at Rf 0.5.

(c) 20 parts by weight of 2-ethoxy-9-(2',3'-isopropylidene - β - D - ribofuranosyl)xanthine of 77.5% purity is cooled at −30° C. and 50 parts by volume of pyrophosphoryl chloride is added thereto dropwise with vigorous stirring. After the addition, the temperature of the resultant mixture is gradually elevated to become 0° C. for 3 hours and the mixture is kept standing with stirring at the same temperature for 3 hours. The reaction mixture is poured into 1000 parts by volume of ice water and the whole mixture is adjusted to pH 1.5 with a 1 N-sodium hydroxide. The mixture is heated at 70° C. for 15 minutes and then is cooled at room temperature. The mixture is allowed to pass through a column packed with 250 parts by weight of activated charcoal. The column is washed with water and is subjected to elution with 1000 parts by volume of a mixture of ethyl alcohol, n-butyl alcohol, 28% aqueous ammonia and water (45:5:2:48). The eluate is concentrated under reduced pressure to 200 parts by volume. The concentrated solution is mixed with 75 parts by volume of 1 N-sodium hydroxide and the mixture is subjected to freeze-drying to give crystalline powder. This is dried on diphosphorus pentoxide at 110° C. for 4 hours to give 13 parts by weight of colorless crystals of sodium 2-ethoxyinosine-5′-phosphate.

The product gives a single ultraviolet absorption figure in paper electrophoresis (0.05 M-borate buffer, pH 9.2), the absorption being $\lambda_{max.}^{0.1\ N\text{-}HCl}$ 253 m$\mu$ and $\lambda_{max.}^{0.1\ N\ NaOH}$ 261 m$\mu$

*Elementary analysis.*—Calculated for $$C_{12}H_{15}N_4O_9PNa_2 \cdot H_2O$$

(percent): N, 12.33; P, 6.83. Found (percent): N, 12.03; P, 7.04.

EXAMPLE 3

1.00 part by weight of 2-chloro-9-(2′,3′-isopropylidene-β-D-ribofuranosyl)xanthine and 150 parts by volume of 2 N-sodium n-propoxide are treated after the manner described in (B) of Example 2 to give 1.01 parts by weight of 2-n-propoxy-9-(2′,3′-isopropylidene-β-D-ribofuranosyl)xanthine.

0.93 part by weight of thus-obtained 2-n-propoxy-9-)2′,3′-isopropylidene-β-D-ribofuranosyl)xanthine and 4.18 parts by weight of pyrophosphoryl chloride are treated after the manner described in (C) of Example 2 to give 0.93 part by weight of barium 2-n-propoxyinosine-5′-phosphate.

Ultraviolet absorption:

$\lambda_{max.}^{0.1\ N\text{-}HCl}$ 253 m$\mu$ ($\epsilon=9.92\times10^3$)

$\lambda_{max.}^{0.1\ N\text{-}NaOH}$ 262 m$\mu$ ($\epsilon=11.7\times10^3$)

*Elementary analysis.*—Calculated for $$C_{13}H_{17}N_4O_9PBa \cdot 2H_2O$$

(percent): C, 27.03; H, 3.66; N, 9.70; P, 5.36. Found (percent): C, 27.17; H, 3.57; N, 9.05; P, 5.20.

This product is treated with 0.23 part by weight of sodium sulfate to give 0.76 part by weight of disodium 2-n-propoxyinosine-5′-phosphate as colorless crystals.

EXAMPLE 4

1 part by weight of 2-chloro-9-(2′,3′-isopropylidene-β-D-ribofuranosyl)xanthine and 150 parts by volume of 2 N-sodium isopropoxide are treated after the manner described in (B) of Example 2 to give 0.98 part by weight of 2-isopropoxy-9-(2′,3′-isopropylidene-β-D-ribofuranosyl)xanthine as powdery crystals.

0.96 part by weight of thus-obtained 2-isopropoxy-9-(2′,3′-isopropylidene-β-D-ribofuranosyl)xanthine and 4.5 parts by volume of pyrophosphoryl chloride are treated after the manner described in (C) of Example 2 to give 0.89 part by weight of barium 2-isopropoxyinosine-5′-phosphate as colorless crystalline powder.

Ultraviolet absorption:

$\lambda_{max.}^{0.1\ N\text{-}HCl}$ 254 m$\mu$ ($\epsilon=9.76\times10^3$)

$\lambda_{max.}^{0.1\ N\text{-}NaOH}$ 262 m$\mu$ ($\epsilon=11.6\times10^3$)

*Elementary analysis.*—Calcd. for $C_{13}H_{17}N_4O_9Ba \cdot 2H_2O$ (percent): C, 27.03; H, 3.66; N, 9.70; P, 5.36. Found (percent): C, 27.22; H, 4.14; N, 10.01; P, 5.53.

This product is treated with 0.22 part by weight of sodium sulfate to give 0.7 part by weight of disodium 2-isopropoxyinosine-5′-phosphate.

EXAMPLE 5

0.07 part of disodium 2-methoxyinosine-5′-phosphate, 10 parts of salt, 5 parts of sugar, 56 parts of skimmed milk powder, 3 parts of monosodium glutamate, 4.5 parts of vegetable shortening and 2 parts of onion powder are homogeneously mingled to give about 150 parts by weight of powdery soup composition. 7.0 parts by weight of the composition is dissolved in 900 parts by volume of hot water to give a soup.

EXAMPLE 6

10 parts by weight of disodium 2-ethoxyinosine-5′-phosphate is dissolved in 90 parts by volume of water. The solution is added to 900 parts by weight of powdered monosodium glutamate and the mixture is kneaded, granulated, dried and sieved to give a granular seasoning composition.

This composition enhances and improves the flavor of, for example, clear soup with its addition thereto at a range of about 0.05 to about 0.1%.

EXAMPLE 7

To 2000 parts by weight of powdered monosodium glutamate there are added a solution of 30 parts by weight of disodium 2-methoxyinosine-5′-phosphate and 50 parts by weight of disodium 5′-inosinate in 150 parts by volume of water. The mixture is kneaded, granulated, dried and sieved to give a granular seasoning composition.

This composition is characterized by high ability of enhancing and improving the flavor of cream soup with its addition thereto at a range of about 0.05 to about 0.1%.

EXAMPLE 8

Raw soy sauce prepared by the conventional method, is sterilized. To 2000 parts by volume of thus-treated soy sauce, there is uniformly added 0.3 part by weight of disodium 2-methoxyinosine-5′-phosphate to give soy sauce which has been enhanced in its flavor.

EXAMPLE 9

To 10,000 parts by volume of Worcestershire sauce prepared by the conventional method, thereto is added 1 part by weight of disodium 2-n-propoxyinosine-5′-phosphate and 10 parts by weight of monosodium glutamate to give Worcestershire sauce which has been enhanced in its flavor.

EXAMPLE 10

Tomato juice is prepared by the conventional method. To 10,000 parts by volume of the tomato juice, there are added 120 parts by weight of sugar, 50 parts by weight of sodium chloride, 10 parts by weight of monosodium glutamate and 2 parts by weight of dipotassium 2-isopropoxyinosine-5′-phosphate and the mixture is sterilized to give tomato juice which has been enhanced in its flavor.

EXAMPLE 11

To 8,000 parts by weight of fish-paste containing 80% of water, there are added 250 parts by weight of sodium chloride, 30 parts by weight of monosodium glutamate and 3 parts by weight of disodium 2-ethoxyinosine-5′-phosphate and the mixture is kneaded. To the mixture there is added 1000 parts by weight of lard, 350 parts by weight of potato starch and 400 parts by weight of wheat starch and the whole mingled thoroughly. The resultant product is packed in a casing. Thus-obtained raw fish sausages are boiled at 85° to 90° C. for 1 hour to give fish sausage which has been enhanced in its flavor.

What is claimed is:

1. A seasoning composition which comprises, as seasoning ingredient, at least one 2-(lower alkoxy)inosing-5′-phosphate, the lower alkoxy having at most 3 carbon atoms.

2. A composition according to claim 1, wherein the 2-(lower alkoxy)inosine-5′-phosphate is in the form of a physiologically acceptable salt.

3. A composition according to claim 2, wherein the physiologically acceptable salt is sodium salt.

4. A composition according to claim 1, wherein the lower alkoxy is methoxy.

5. A composition according to claim 1, wherein the lower alkoxy is ethoxy.

6. A composition according to claim 1, wherein the lower alkoxy is n-propoxy.

7. A composition according to claim 1, wherein the lower alkoxy is isopropoxy.

8. A composition according to claim 1, which comprises in addition monosodium glutamate.

9. A composition according to claim 8, wherein the ratio by weight of 2-(lower alkoxy)inosine-5'-phosphate relative to monosodium glutamate is about 1/500 to about 1/5.

10. A method for improving or enhancing flavor of foods or beverages, which comprises incorporating into foods or beverages as seasoning ingredient, an effective amount of at least one 2-(lower alkoxy)inosine-5'-phosphate, the lower alkoxy having at most 3 carbon atoms.

11. A method according to claim 10, wherein the 2-(lower alkoxy)inosine-5'-phosphate is in the form of a physiologically acceptable salt.

12. A method according to claim 11, wherein the physiologically acceptable salt is sodium salt.

13. A method according to claim 10, wherein the 2-(lower alkoxy)inosine-5'-phosphate is incorporated into the food or beverage in combination with monosodium glutamate.

14. A method according to claim 10, wherein the lower alkoxy is methoxy.

15. A method according to claim 10, wherein the lower alkoxy is ethoxy.

16. A method according to claim 10, wherein the lower alkoxy is n-propoxy.

17. A method according to claim 10, wherein the lower alkoxy is isopropoxy.

References Cited

UNITED STATES PATENTS

| | | | |
|---|---|---|---|
| 3,408,206 | 10/1968 | Yamazaki et al. | 99—140 U |
| 3,126,372 | 3/1964 | Bannister | 260—211.5 R |
| 3,014,900 | 12/1961 | Schroeder | 260—211.5 R |
| 2,852,506 | 9/1958 | Goldman et al. | 260—211.5 R |

OTHER REFERENCES

Schultz (ed.), "The Chemistry & Physiology of Flavors," A.V.I. Pub. Co., Westport, Conn. (1967) pp. 515–535.

MORRIS O. WOLK, Primary Examiner

W. BOVEE, Assistant Examiner